G. E. BARSTOW.
CLAMP FOR ELECTRIC WELDING MACHINES.
APPLICATION FILED MAY 11, 1907.
953,579.
Patented Mar. 29, 1910.
5 SHEETS—SHEET 1.
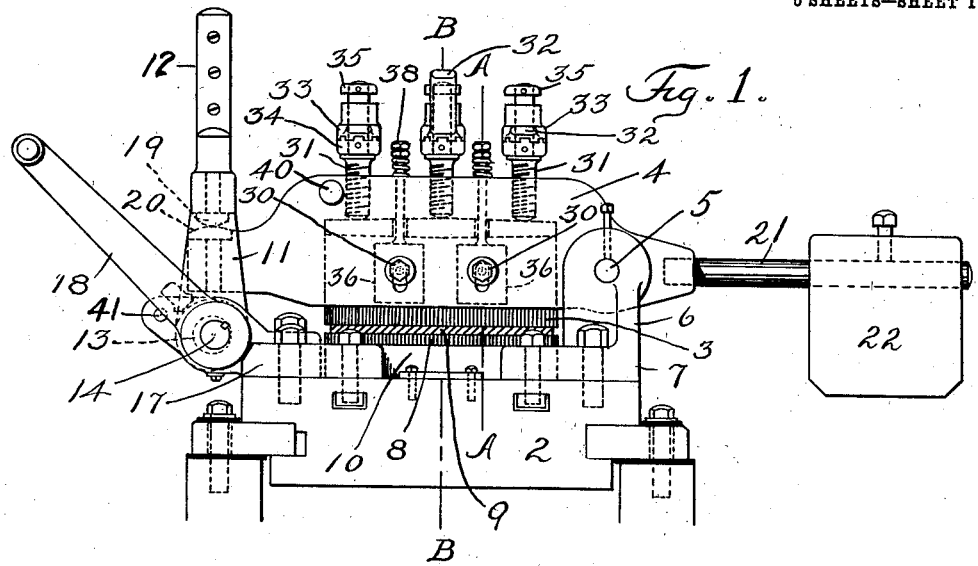
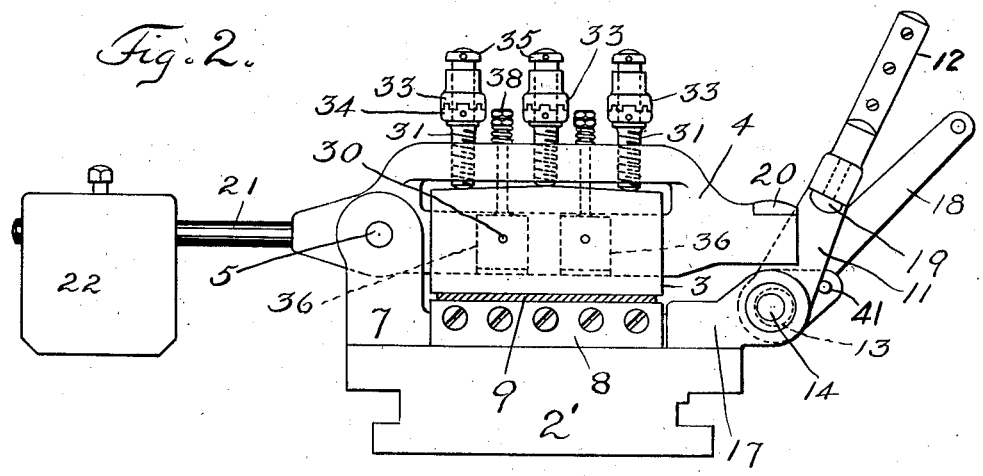
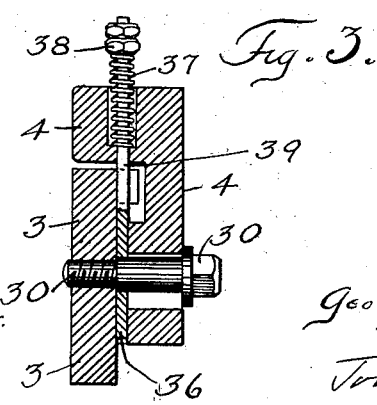
WITNESSES:
INVENTOR
George E. Barstow
BY
ATTORNEYS

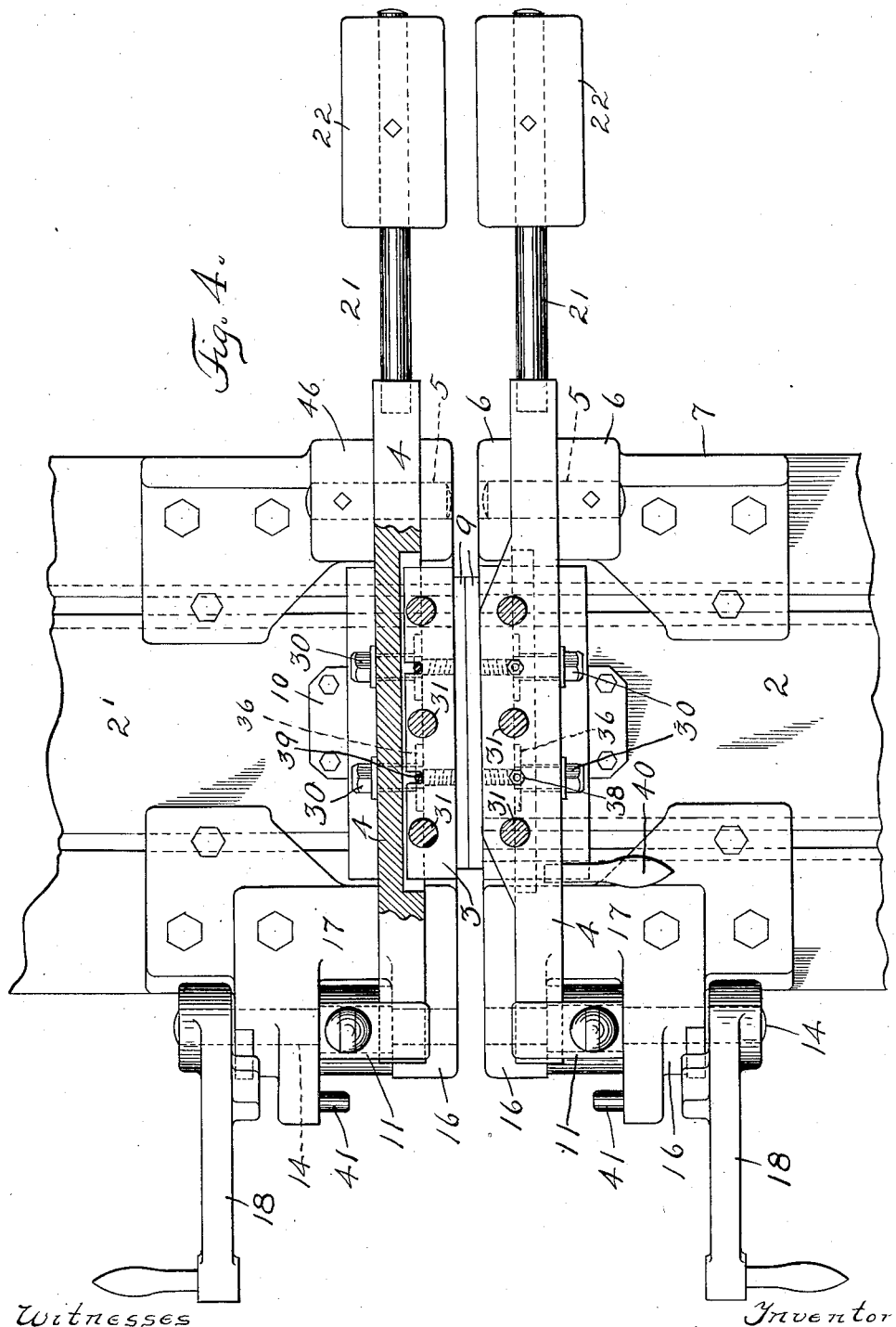

G. E. BARSTOW.
CLAMP FOR ELECTRIC WELDING MACHINES.
APPLICATION FILED MAY 11, 1907.
953,579.
Patented Mar. 29, 1910.
5 SHEETS—SHEET 3.
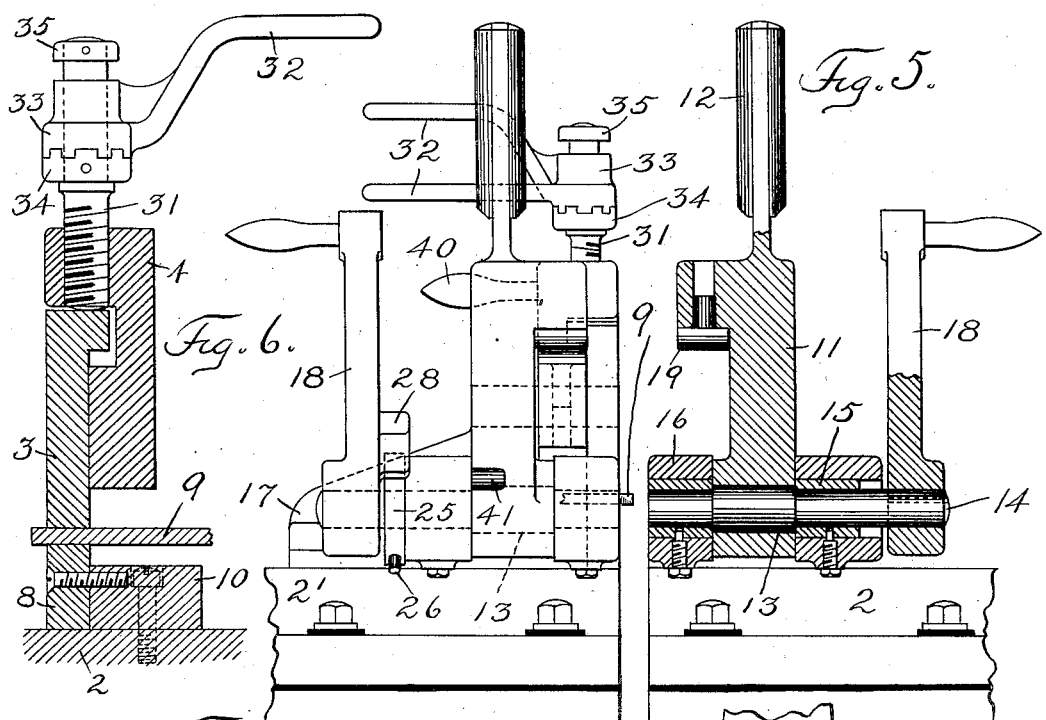
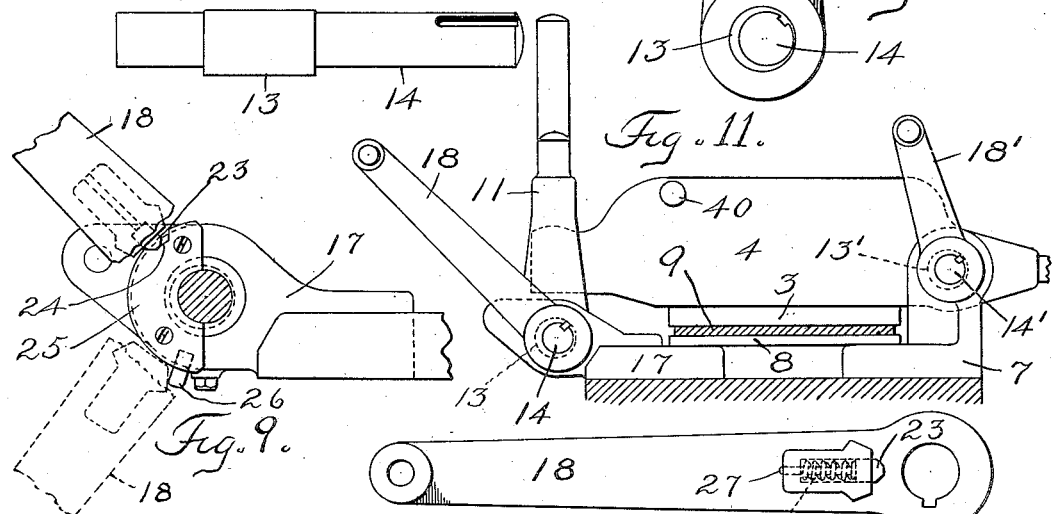
WITNESSES:
INVENTOR
George E. Barstow
BY
Townsend & Decker
ATTORNEYS

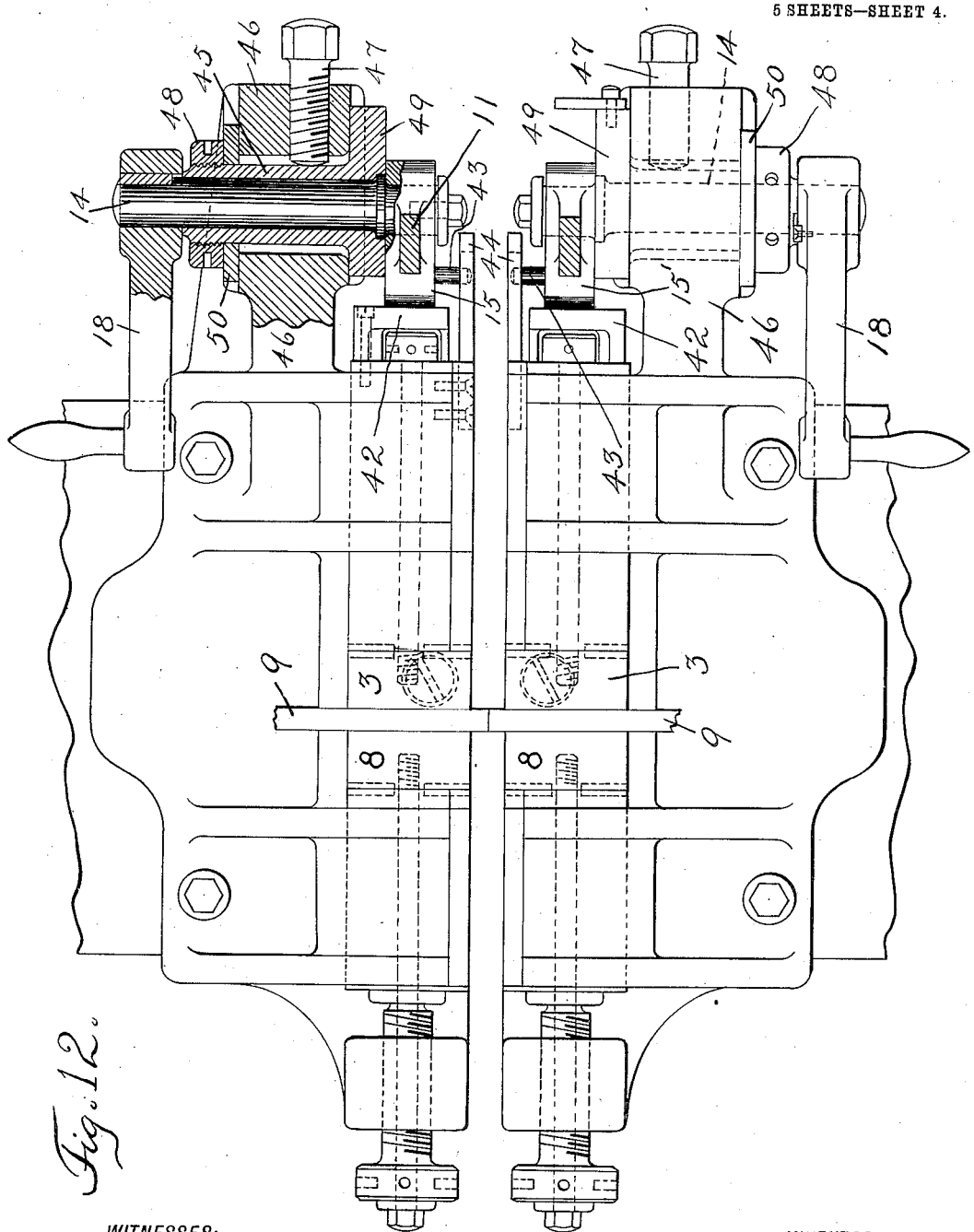

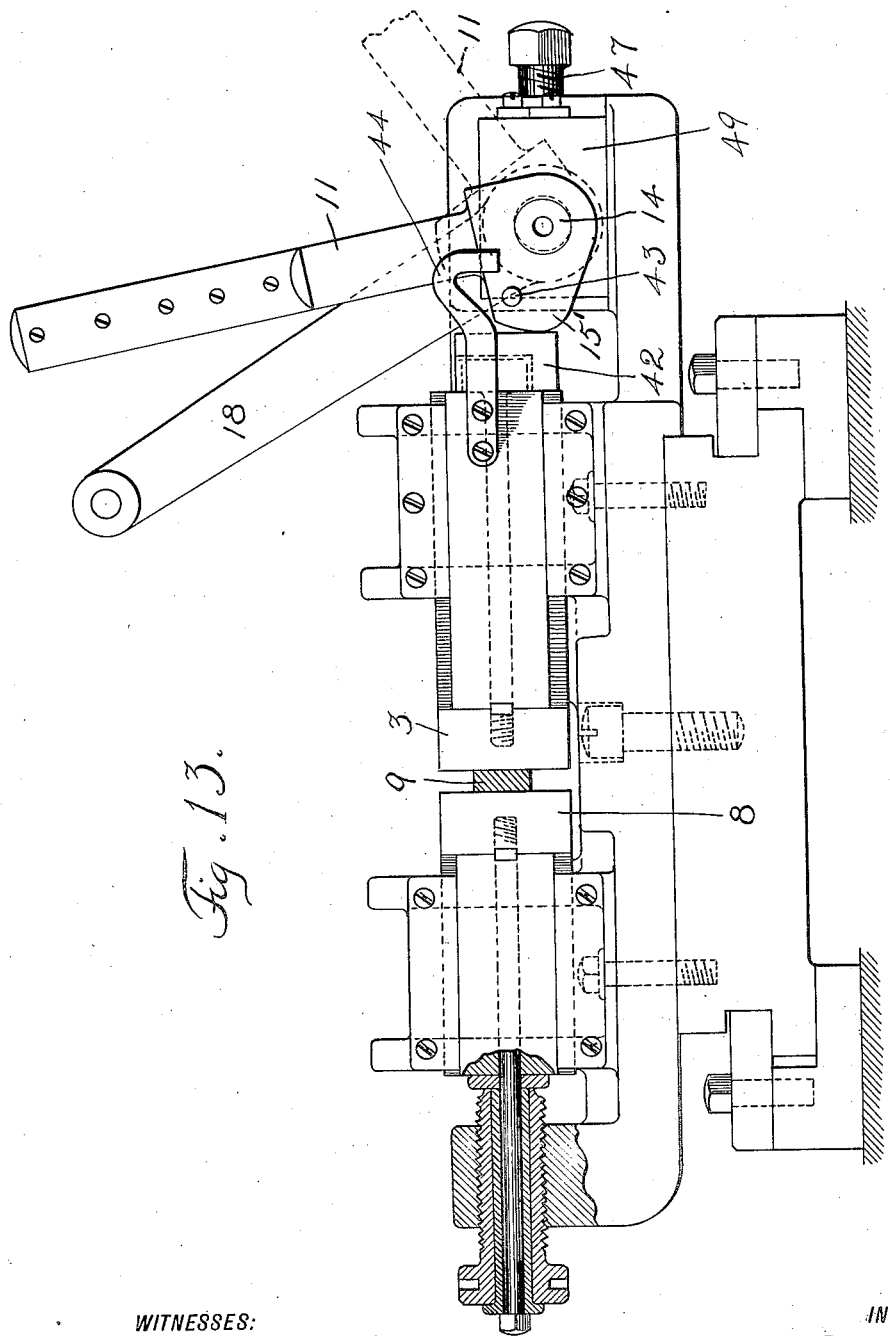

UNITED STATES PATENT OFFICE.

GEORGE E. BARSTOW, OF LYNN, MASSACHUSETTS, ASSIGNOR TO THOMSON ELECTRIC WELDING COMPANY, OF LYNN, MASSACHUSETTS, A CORPORATION OF MAINE.

CLAMP FOR ELECTRIC WELDING-MACHINES.

953,579.  Specification of Letters Patent.  Patented Mar. 29, 1910.

Application filed May 11, 1907. Serial No. 373,030.

*To all whom it may concern:*

Be it known that I, GEORGE E. BARSTOW, a citizen of the United States, and a resident of Lynn, in the county of Essex and State of Massachusetts, have invented certain new and useful Improvements in Clamps for Electric Welding-Machines, of which the following is a specification.

My invention relates to work clamping mechanism for electric metal working apparatus and is designed to provide an efficient and rapidly operable mechanism capable of applying heavy clamping pressure.

In an electric metal working apparatus, it is frequently necessary when the work is heavy, to apply a very heavy clamping pressure to the work in order to prevent displacement thereof in the work-holding devices. This is especially necessary in the operation of welding heavy pieces of metal in which operation it is necessary to apply very heavy pressure to the work in a line which would tend to displace the work in the clamping mechanism.

Generally speaking, my invention consists of a clamping mechanism, having a pivotally mounted member combined with an eccentric forming the pivotal mounting for said member whereby after the clamping jaw has been engaged with the work by the turning of said member on its pivot, the operation of the eccentric will apply the final heavy pressure to securely fix the work.

My invention may be carried out in various ways. Thus, for instance, the lever by the turning of which the clamping jaw is fastened in engagement with the work may have its pivotal mounting upon the eccentric so that after said fastening lever has been operated, the turning of the eccentric by an operating arm or other device connected thereto will apply the increased pressure. Or the clamping mechanism may have its clamping jaw pivotally mounted and the eccentric may serve as the pivotal support for said pivotally mounted clamping jaw so that after the jaw has been turned on its pivot and engaged with the work and fastened by any proper fastening device, the subsequent turning of the eccentric by any proper operating device will apply the heavy or final pressure. Also in carrying out my invention, the clamping jaw may be either pivotally or slidably mounted as will hereinafter more clearly appear from the subjoined description taken in connection with the accompanying drawings.

My invention permits not only the application of a very heavy pressure to the work, but enables the operator to manipulate the clamping mechanism in an expeditious manner so that, although the work is large and the clamping pressure heavy, no time will be wasted in the insertion and removal of the work from its position in the work-holder.

My invention consists further in the special details of construction and combinations of parts hereinafter more particularly described and then specified in the claims.

In the accompanying drawings: Figure 1 is an end elevation of one form of apparatus embodying my invention. Fig. 2 is a similar view taken from the reverse end. Fig. 3 is a vertical longitudinal section through a portion of the device carrying the removable clamp jaw taken on the line A, A, Fig. 1. Fig. 4 is a plan of the apparatus, a portion being shown in horizontal section. Fig. 5 is a side elevation and partial section of the apparatus, the section being taken vertically through one of the fastening levers and its eccentric mounting. Fig. 6 is a vertical section on the line B, B, Fig. 1. Fig. 7 is a detached side view of the eccentric shaft. Fig. 8 is an end view of said shaft with the fastening lever mounted on the eccentric thereof. Fig. 9 is a detail view showing the device for holding the fastening lever in position for freeing the clamp jaw. Fig. 10 is a side elevation of the lever with the attached spring dog. Fig. 11 is a side elevation of the pivotally mounted clamping jaw and illustrates a modification of my invention in which the eccentric is applied to the pivotal support of the jaw. Fig. 12 is a plan and horizontal section illustrating the application of my invention to a work clamping mechanism in which the clamping jaws are slidably mounted. Fig. 13 is an end elevation of the apparatus shown in Fig. 12.

Referring to Figs. 1 to 5, the usual platens or supports for the work clamping mechanism are indicated at 2, 2'. These platens work in the usual way upon any proper guides on the frame or table of the machine and are connected to a source of electric energy such, for instance, as the flexible secondary of a transformer in ways well known in the art and which need not be described in detail as they form no part of my present invention.

In Figs. 4 and 5 the clamping mechanisms of both platens are shown, but a description of one will suffice.

3 is the upper clamping jaw pivotally mounted by pivoting its supporting lever or block 4 on the pivot 5 mounted in standards 6 rising from a casting 7 which is bolted to the platen or other support in the usual manner. The manner of securing the clamping jaw on its lever support 4 and adjusting the surface of the jaw with relation to the work will be described later on.

8 is the lower or fixed jaw and 9 is a piece of work clamped between the jaws 3 and 8. The lower jaw 8 is preferably, as illustrated in Fig. 6, detachably secured to the side of a block 10, said block being itself fastened to the platen or other support. As usual in the art, the jaw 8 is made of some hard metal of good conducting quality such, for instance, as bronze and the block or support 10, to which it is attached, is made usually of copper.

11 is a fastening lever for fastening the jaw down into engagement with the work for which purpose it may be brought into and out of engagement with the jaw carrying lever 4 by means of the operating handle 12 serving to swing the portion 11 of the clamping mechanism upon the pivotal support thereof. In Figs. 1 to 5, inclusive, I show my present invention as applied to this pivoted portion of the clamping mechanism by using an eccentric 13 as the pivotal mounting for the lever 11.

14 is an eccentric shaft which is mounted in any proper manner, as, for instance, in bearings 15 secured in bosses 16 projecting from a plate or casting 17. The latter is fastened in any proper manner to any suitable support as, for instance, to the platen. Connected to the shaft of the eccentric 14 is an operating arm or lever 18 whereby the shaft may be turned to operate the eccentric and thereby pull down the fastening lever 11 with its attachment engaging the jaw-carrying lever 4. The pivotally mounted lever 11 of the clamping mechanism may engage lever 4 and secure the jaw carried thereby in engagement with the work by a device of any kind as may be found convenient. The device shown comprises a cam block 19 adapted to ride upon a cam block 20 mounted on the jaw carrying lever 4 in the manner commonly employed in the art. When the pivoted fastening lever 11 is swung back to position shown in Fig. 2, the jaw is freed and its supporting lever 4 may be turned up to permit withdrawal of the work, but when the jaw is down upon the work and the lever 11 is swung forward, the cam block 19, by engaging the inclined surface on the block 20, fastens the clamping jaw down upon the work firmly, after which a much heavier or reinforced pressure is secured by turning the eccentric shaft 14 by means of the operating arm 18. As already stated, the eccentric may be applied to any pivoted member of the fastening mechanism and I have, in Fig. 11, shown the same as applied to the pivotal mounting of the clamping jaw by utilizing the eccentric illustrated in dotted lines at 13' as the pivot for the jaw-carrying lever 4. The eccentric shaft 14' would in this case be provided with an operating lever 18' similar to 18 so that, after the clamping jaw has been fastened down upon the work by any device as, for instance, fastening lever 11 whether mounted eccentrically or not, the turning of the eccentric by its operating lever 18' will permit the application of the necessary heavy or reinforced pressure.

The jaw carrying lever 4 may be provided with a rearwardly extending arm 21 carrying a weight 22 by means of which the jaw will be raised from the work when freed from the fastening device. The fastening cam block 19 is, preferably, detachably secured to the fastening lever 11 by means of a pin on the block which may be driven into a socket in a lateral projection of the lever. In case of renewal, the pin with its attached cam block 19 may be driven out of its socket in obvious manner. The eccentric operating lever 18 is preferably provided with a spring catch comprising a spring actuated dog 23 which, when the lever is turned up to position shown in Fig. 1 to free the clamping mechanism from the action of the eccentric, will engage a notch at 24 formed in the edge of a catch plate 25 which is secured to the side of one of the bosses 16 or other suitable fixed support. By this means the lever will be held up but, by forcible movement of the lever in a direction to carry its handle end downward, the catch will be freed and the eccentric will be turned to apply the heavy or reinforced pressure. The catch plate is shown in edge view in Fig. 5 but is omitted from the sectional portion of the figure at the right hand side thereof to avoid confusion.

A stop 26 projecting from the plate limits the downward throw of the eccentric operating lever 18 in applying the heavy or reinforced pressure so as to prevent the passage of the eccentric over the high point in a manner to relieve the pressure.

The spring actuated dog 23 is mounted upon a rod 27 and works with said rod in a bore formed in a projection 28 formed or attached to the side of the operating lever 18. A spring 29 surrounding the rod 27 and working against the head constituting dog 23 serves to force the dog into engagement with the notch 24 and to keep the dog engaged with the edge of the catch plate 25.

The work clamping jaw 3 is, preferably, detachably secured to the lever 4 and is provided with means whereby it may be adjusted to bring the plane of its clamping face into proper relation to the plane of the work engaged thereby. For this purpose, the jaw is fastened against the side of the lever 4 by means of fastening screws or bolts 30 after adjustment of position of the jaw upon the lever by means of the several adjusting screws 31 which bear upon the upper side or edge of the clamp jaw and work in openings tapped vertically in the overhanging upper edge of the lever 4, as more clearly shown in Fig. 6. Each adjusting screw 31 is preferably operated by means of an arm 32 extending from a toothed hub or sleeve 33, the teeth of which engage a correspondingly notched sleeve 34 pinned or fastened to the screw shaft. The hub 33 is free to move longitudinally of the screw shaft to disengage its teeth from the notches in the sleeve 34 and to prevent detachment of sleeve 33 from the screw shaft the latter is provided with the head 35. By this device the operating arms or levers 32 may be brought around to any position where they will be out of the way after the screw has been turned in adjusting the clamp jaw. This device also aids the operator in turning the screw step by step by turning the lever 32 in the arc of a circle, whereas were the arm rigidly attached to the screw it would be necessary in any extended adjustment to turn the lever through a whole circle.

The clamping bolts or screws 30 work in vertically elongated slots or openings in the side of the jaw carrying lever 4. In order that the jaw may rise automatically when the adjusting screws are turned back and be retained in engagement with the ends of said screws, I provide plates 36 interposed between the jaw and the face on lever 4 against which it is fastened by the clamping screws or bolts 30 and having an opening through which the untapped portion of the bolt passes. The plate 36 is lifted by the action of a spring 37 seated in a socket in the top of the lever 4 and working against the head 38 of a rod 39 rising from the plate 36. To adjust the jaw, the screws 31 are adjusted as may be required to set the jaw in the proper position upon the lever 4. If the screws 31 be turned down the plates 36 will follow the jaw and the clamping bolts 30, the springs 37 yielding in such case. If the screws are turned back, the springs 37 will raise the plates 36 with the bolts and attached jaw keeping the upper edge of the jaw engaged with the adjusting screws. After re-adjustment the setting of the bolts 30 will fix the jaw on the supporting lever 4 in the desired position.

In the operation of the apparatus for the insertion of a new piece of work the fastening lever 11 is turned to free the pivotally mounted jaw and permit the jaw-carrying lever to rise under the action of the weight 22 and leave the work freely exposed for removal and to permit the placing of a fresh piece of work upon its support. The clamping jaw is then brought down upon the work and the pivotally mounted member 11 of the clamping devices is turned up to position shown in Fig. 1 to fasten the jaw in engagement with the work. The eccentric operating lever 18 which at such time is in position shown in Fig. 1, where it will be held sustained by the catch already described, is then forcibly turned down as far as it will go toward position indicated in Fig. 9, thus turning the eccentric forming the pivotal mounting of the member 11 and applying the reinforced or heavy pressure; or obviously the heavy or reinforced pressure may be applied or may be supplemented by operating the lever 18′ in the proper direction provided the lever 4 be a member of the clamping devices which is pivotally mounted on an eccentric. A handle 40 may be applied to the jaw-carrying lever 4 to assist in bringing the same down upon the work and a stop 41 may be provided for limiting the backward movement of the fastening lever 11 when thrown to free the lever 4. Obviously the same devices may be used for the clamping devices carried by both platens 2 and 2′.

Figs. 13 and 12 illustrate the application of my invention to a slidably mounted clamping jaw and clamping mechanism having a pivoted member of the general construction illustrated in patents to A. F. Rietzel No. 766,288 dated Aug. 2nd, 1904, or No. 804,045, dated Nov. 7th, 1905. The fastening in this instance comprises a cam projection 15′ extending from the hub of the fastening lever 11 and engaging a detachable plate 42 on the end of the slide which carries the clamp jaw 3. Lever 11 is pivotally mounted by its hub as better shown in Fig. 12 on the eccentric portion of the eccentric shaft 14, said shaft being provided, as already described, with an operating arm or lever 18. A pin 43 projecting from the hub or casting operates on the hook 44 extending from the slide to retract the jaw 3 and free the work 9. The opposite jaw 8 is mounted and adjusted as described in Patent No. 766,288. The shaft for the eccentric is suitably mounted in a bearing capable of adjustment to and from the work thereby permitting the eccentric to be adjusted so that it will act properly in case of variation of the size of the work. For this purpose the bearing 45 for the shaft 14 is mounted in a horizontal elongated opening in the casting 46 and said casting is provided with a set screw 47 which engages the bearing 45 and thereby adjusts the same with the shaft and eccentric in relation to the work. When the adjusted position has been reached, the bearing is clamped by means of the nut 48 upon one end of the bearing which draws the head 49 of the bearing against one side of the casting and clamps the washer 50 against the opposite side thereof as clearly illustrated in Fig. 12.

The operation of the apparatus shown in Figs. 12 and 13 is essentially, so far as concerns my present invention, the same in principle as that shown in the other figures.

The pivotally mounted member 11 of the clamping devices having been operated to fasten the slidably mounted jaw 3 against the work, the lever 18 attached to the eccentric shaft is turned, thereby applying increased pressure to the jaw 3 by the action of the eccentric upon the pivotally mounted member 11. To free the work, the eccentric-operating arm or lever 18 is turned back and then the pivotally mounted member 11 is turned to uncouple or free the fastening device.

I do not limit myself to pivotally mounting any particular member of the clamping mechanism for the work upon an eccentric, but prefer to apply the eccentric to the pivot of that member of the clamping mechanism which carries a fastening device movable into and out of position to set, hold or bring the clamping jaw into engagement with the work with an initial pressure which, by the operation of the eccentric, can be reinforced or supplemented to immovably clamp the work as already described.

What I claim as my invention is:

1. In an electric metal working apparatus, the combination of work clamping devices having a pivotally mounted member adapted to engage the clamping jaw with the work by a turning movement upon its pivot, and an eccentric forming a pivotal point of support for said member, as and for the purpose described.

2. In an electric metal working apparatus, the combination of work clamping mechanism having a pivotally mounted member adapted to engage the clamping jaw with the work by a turning movement on its pivot, an eccentric forming the pivotal mounting therefor, and an eccentric shaft provided with an operating arm, as and for the purpose described.

3. In an electric metal working apparatus, the combination of work clamping devices having a pivotally mounted fastening device adapted to bring the clamping jaw in engagement with the work by a turning movement on its pivot, and an eccentric forming the pivotal mounting for said fastening device.

4. In an electric metal working apparatus, the combination of work clamping mechanism having a pivotally mounted fastening device adapted to fasten the clamping jaw in engagement with the work by turning on its pivot, an eccentric forming the pivotal mounting therefor and an eccentric shaft provided with an operating arm, as and for the purpose described.

5. In an electric metal working apparatus, the combination of work clamping mechanism having a clamping jaw mounted on a pivoted support, a pivotally mounted fastening lever adapted to engage said support by a turning movement on its pivot to fasten said jaw in engagement with the work, and an eccentric forming the pivotal mounting for said fastening lever.

6. In an electric metal working apparatus, the combination of a work clamping mechanism having a clamping jaw, a pivotally mounted support therefor and a pivotally mounted fastening device adapted to engage the support and fasten the jaw in engagement with the work, an eccentric forming the pivotal mounting for said fastening device and an eccentric shaft provided with an operating arm, as and for the purpose described.

7. In an electric metal working apparatus, the combination of a clamping jaw, a support for the same, a fastening lever having a cam adapted to engage the support and fasten the jaw upon the work, an eccentric upon which said lever is pivoted, and an eccentric shaft provided with means for operating the same, as and for the purpose described.

8. In an electric metal working apparatus, the combination of a clamping jaw, a pivoted support therefor, a pivoted fastening lever provided with a lug or projection adapted to engage the pivoted support to fasten the jaw in engagement with the work and an eccentric forming a pivotal mounting for said fastening lever.

9. In an electric metal working apparatus, the combination of a pivotally mounted clamping jaw, an eccentric forming the pivotal mounting for the jaw and a shaft for said eccentric provided with an operating arm, as and for the purpose described.

Signed at Lynn in the county of Essex and State of Massachusetts this 17th day of April A. D. 1907.

GEORGE E. BARSTOW.

Witnesses:
 ADA J. NICHOLS,
 GEO. W. N. CHADWELL.